United States Patent
Ikeda et al.

(10) Patent No.: US 10,249,027 B2
(45) Date of Patent: Apr. 2, 2019

(54) DEVICE AND METHOD FOR P-PHASE DATA COMPRESSION

(71) Applicant: SONY CORPORATION, Tokyo (JP)

(72) Inventors: Masaru Ikeda, Tokyo (JP); Ali Tabatabai, Cupertino, CA (US)

(73) Assignee: SONY CORPORATION, Tokyo (JP)

( * ) Notice: Subject to any disclaimer, the term of this patent is extended or adjusted under 35 U.S.C. 154(b) by 148 days.

(21) Appl. No.: 15/272,918

(22) Filed: Sep. 22, 2016

(65) Prior Publication Data

US 2018/0084220 A1 Mar. 22, 2018

(51) Int. Cl.
| | |
|---|---|
| H04N 5/357 | (2011.01) |
| H04N 5/363 | (2011.01) |
| H04N 5/917 | (2006.01) |
| G06T 5/00 | (2006.01) |
| H04N 5/232 | (2006.01) |
| H04N 5/77 | (2006.01) |
| H04N 9/79 | (2006.01) |

(52) U.S. Cl.
CPC .......... G06T 5/002 (2013.01); H04N 5/23229 (2013.01); H04N 5/772 (2013.01); H04N 9/79 (2013.01); H04N 5/3575 (2013.01); H04N 5/363 (2013.01)

(58) Field of Classification Search
CPC ...... H04N 5/357; H04N 5/3575; H04N 5/363; H04N 5/917
See application file for complete search history.

(56) References Cited

U.S. PATENT DOCUMENTS

| | | | | |
|---|---|---|---|---|
| 5,764,374 | A | * 6/1998 | Seroussi | H04N 19/593 |
| | | | | 341/65 |
| 8,879,629 | B2 | 11/2014 | De Rivaz | |
| 9,077,924 | B2 | * 7/2015 | Wong | H04N 5/378 |
| 9,161,058 | B2 | 10/2015 | Kim | |
| 2009/0167922 | A1 | * 7/2009 | Perlman | H04N 5/357 |
| | | | | 348/340 |
| 2014/0168362 | A1 | 6/2014 | Hannuksela et al. | |
| 2015/0062377 | A1 | * 3/2015 | Wong | H04N 5/378 |
| | | | | 348/231.99 |
| 2015/0288910 | A1 | * 10/2015 | Wong | H04N 5/378 |
| | | | | 348/308 |
| 2015/0288974 | A1 | 10/2015 | Rubinstein et al. | |
| 2015/0319444 | A1 | 11/2015 | Ando | |
| 2016/0119570 | A1 | * 4/2016 | Wong | H04N 5/3575 |
| | | | | 348/308 |

\* cited by examiner

Primary Examiner — Abdelaaziz Tissire
(74) Attorney, Agent, or Firm — Chip Law Group (57) ABSTRACT

An imaging device and method for P-phase data compression are provided. The imaging device includes one or more circuits configured to receive a plurality of blocks of P-phase data values from an image sensor. A predictor value is determined for a first input block of the plurality of blocks of P-phase data values. A reconstructed first block of P-phase data values is generated, based on the P-phase data values of the first input block and the determined predictor value. The determined predictor value is then updated for a second block of P-phase data values based on the P-phase data values of the generated reconstructed first block. Compressed P-phase data values that correspond to the received plurality of blocks of P-phase data values are generated, based on the reconstructed first block and at least a reconstructed second block.

28 Claims, 7 Drawing Sheets

DEVICE AND METHOD FOR P-PHASE DATA
COMPRESSION

CROSS-REFERENCE TO RELATED APPLICATIONS/INCORPORATION BY REFERENCE

None.

FIELD

Various embodiments of the disclosure relate to data compression. More specifically, various embodiments of the disclosure relate to an imaging device and method for P-phase data compression.

BACKGROUND

Image sensors are widely used in imaging devices, such as digital cameras, medical imaging equipment, thermal imaging devices, radar, sonar, and other electronic devices. Such imaging devices that include the image sensors may be associated with digital Correlated Double Sampling (CDS) processing. The CDS processing may include a noise component and a true signal component. The noise component may be referred to as P-phase data. The true signal component may be referred to as D-phase data. The difference between the P-phase data and the D-phase data may be used to remove noise, such as an internal thermal noise (kTC noise), associated with an image or a sequence of images to be captured by use of an image sensor of an imaging device. However, in imaging devices that use a global shutter, the CDS process requires the noise component, such as the P-phase data, to be stored before the true signal component, such as the D-phase data, received from the image sensor. The global shutter may refer to a shutter mode that controls incoming light to all light-sensitive elements of an imaging device simultaneously. Thus, in the imaging devices that use the global shutter, every pixel may be exposed simultaneously at the same instant in time. In order to save memory or storage space of the imaging device, it may be desirable to compress the noise component, such as the P-phase data. The compression of the P-phase data requires that the kTC noise should remain constant while there is a reduction of the additional noise incurred due to P-phase data compression.

Conventional compression methods for low-complexity compression may include differential pulse code modulation (DPCM). DPCM may be effective for image compression, where the captured image has adjacent pixel intensity values that are highly similar to each other. However, for data that exhibit noise-like characteristics, such as the P-phase data, the DPCM based compression method may not be effective for compression.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A device and method are provided for P-phase data compression in an imaging device substantially as shown in, and/or described in connection with, at least one of the figures, as set forth more completely in the claims.

These and other features and advantages of the present disclosure may be appreciated from a review of the following detailed description of the present disclosure, along with the accompanying figures, in which like reference numerals refer to like parts throughout.

DETAILED DESCRIPTION

The following described implementations may be found in the disclosed imaging device and method for P-phase data compression. Exemplary aspects of the disclosure may include a method for P-phase data compression in an imaging device. The method may be implemented by one or more circuits of the imaging device. The method may include receipt of a plurality of blocks of P-phase data values from an image sensor. The method may further include determination of a predictor value for a first input block of P-phase data values. The first input block may correspond to one of the received plurality of blocks representative of a plurality of pixels in a current image frame. Furthermore, the method may include generation of a reconstructed first block of P-phase data values, based on the P-phase data values of the first input block and the determined predictor value. The P-phase data values in the generated reconstructed first block may correspond to compressed P-phase data values of the first input block. The reconstructed first block may be generated based on a difference between each of the P-phase data values of the first input block and the determined predictor value. The determined predictor value may be updated for a second block of P-phase data values, based on the P-phase data values of the generated reconstructed first block. In accordance with an embodiment, the second block may correspond to another of the received plurality of blocks representative of pixels in a current image frame. In accordance with an embodiment, the one or more circuits may be further configured to update the determined predictor value, based on an average value or a mean value of the P-phase data values of the generated reconstructed first block. Further, the method may include generation of compressed P-phase data values that correspond to the received plurality of blocks of P-phase data values, based on the reconstructed first block and at least a reconstructed second block. The reconstructed second block may be generated based on the P-phase data values of the second block of P-phase data values and the updated predictor value.

In accordance with an embodiment, the predictor value for the first input block of the P-phase data values may be determined based on one of an average value or a mean value representative of the P-phase data values of the first input block. In accordance with an embodiment, the predictor value for the first input block of the P-phase data values may be determined based on a final average value of a plurality of average values of P-phase data values. The plurality of average values may be column-by-column average values of a plurality of columns that correspond to another plurality of blocks representative of a plurality of pixels in a previous image frame. In accordance with an embodiment, the predictor value for the first input block of the P-phase data values may be determined based on application of a polynomial function on the final average value of the plurality of average values of the P-phase data values.

In accordance with an embodiment, the one or more circuits may be further configured to compute a difference between the generated compressed P-phase data values and D-phase data values associated with the plurality of blocks representative of a plurality of pixels in a current image frame. In accordance with an embodiment, the one or more circuits may be further configured to transform the current image frame to a refined current image frame, based on the computed difference between the generated compressed P-phase data values and the D-phase data values. In accordance with an embodiment, the difference may be utilized to obtain the refined current image frame by removal of noise from the current image frame. The image sensor may comprise a plurality of light-sensing elements. The difference may correspond to cancellation of the P-phase data values from corresponding D-phase data values for each of the plurality of light-sensing elements. Such a cancellation may be used to generate correlated double sampling (CDS) corrected digital output pixel values in the refined current image frame.

In accordance with an embodiment, the P-phase data values received from the image sensor may be processed prior to processing of the D-phase data values. This may be done to enable storage of the received P-phase data values as the generated compressed P-phase data values in a memory unit of the imaging device. In accordance with an embodiment, the P-phase data values may correspond to digital pixel reset values that represent reference voltages of a plurality of pixels in the current image frame. In accordance with an embodiment, the D-phase data values may correspond to light dependent digital pixel values that represent signal voltages of the plurality of pixels in the current image frame.

Figure 1A:
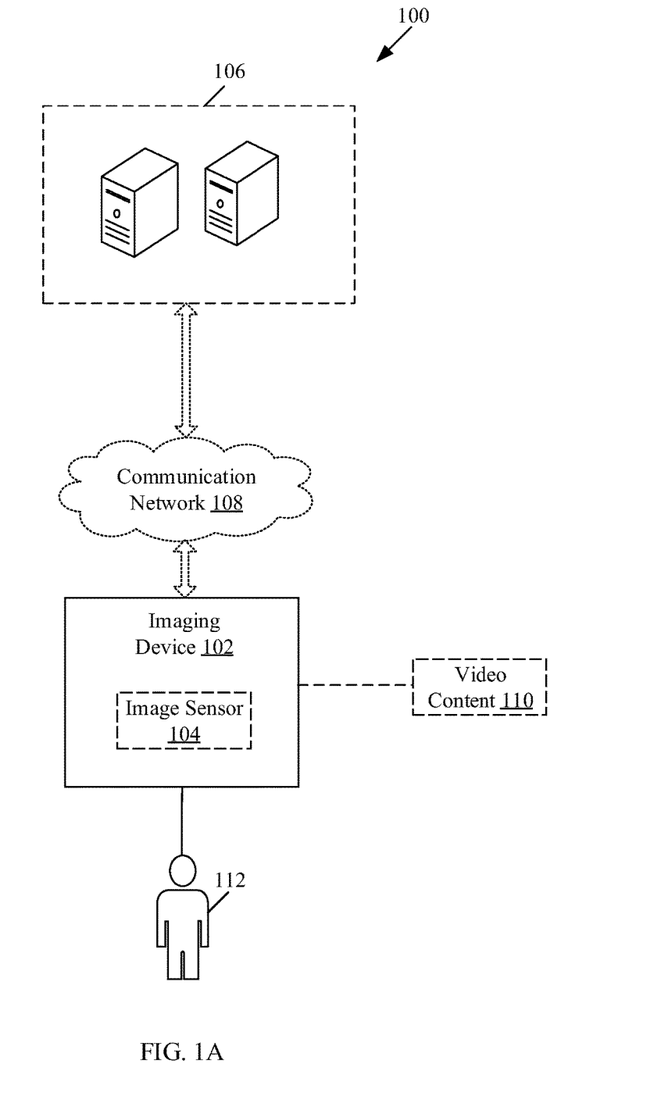
FIGS. 1A and 1B, collectively, depict a block diagram that illustrates an exemplary network environment for P-phase data compression by an imaging device, in accordance with an embodiment of the disclosure.
Figure 1B:
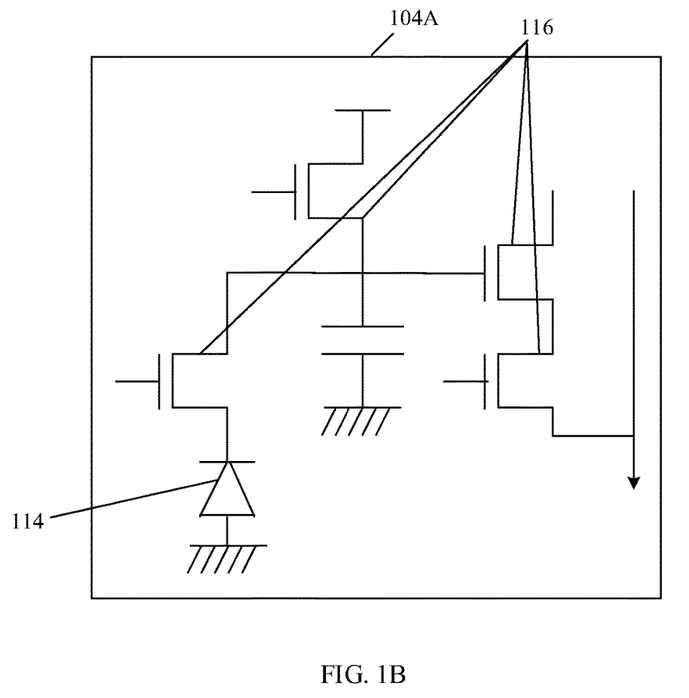

FIGS. 1A and 1B, collectively, depict a block diagram that illustrates an exemplary network environment for P-phase data compression by an imaging device, in accordance with an embodiment of the disclosure. With reference to FIG. 1A, there is shown an exemplary network environment 100. The exemplary network environment 100 may be also referred to as a network system. The exemplary network environment 100 may include an imaging device 102, an image sensor 104, one or more cloud resources, such as a server 106, and a communication network 108. There is further shown video content 110 and one or more users, such as a user 112. With reference to FIG. 1A, the imaging device 102 may be communicatively coupled to the server 106, via the communication network 108. The imaging device 102, associated with the user 112, may be configured to capture and/or process the video content 110. The image sensor 104 may be included in the imaging device 102.

The imaging device 102 may comprise suitable logic, circuitry, interfaces, and/or code that may be configured to communicate with the server 106, via the communication network 108. The imaging device 102 may further include circuitry that may be configured for P-phase data compression. The imaging device 102 may include the image sensor 104. Examples of the imaging device 102 may include, but are not limited to, a digital camera, a digital camcorder, a camera module, a medical imaging equipment, a night vision equipment, such as a thermal imaging devices, a radar, a sonar, an image- or a video-processing device, a motion-capture system, and/or a projector device.

The image sensor 104 may comprise suitable logic, circuitry, interfaces, and/or code that may be configured to detect and convey information that constitutes an image of a sequence of image frames of the video content 110. The image sensor 104 converts the variable attenuation of light waves into signals or small bursts of current that convey the information. Examples of the image sensor 104 may include, but are not limited to, one or more semiconductor charge-coupled devices (CCD), complementary metal-oxide-semiconductor (CMOS) image sensors, digital pixel system (DPS) sensors, and/or other digital sensors, such as flat panel detectors.

The server 106 may comprise a plurality of logic circuits, interfaces and/or code that may be configured to communicate with the imaging device 102, via the communication network 108. Examples of the server 106 may include, but are not limited to a web server, a database server, a file server, an application server, or a combination thereof. The server 106 may be implemented by use of several technologies that are well known to those skilled in the art.

The communication network 108 may include a medium through which the imaging device 102 and the server 106, may communicate with each other. The communication network 108 may be a wired or wireless communication network. Examples of the communication network 108 may include, but are not limited to, a Wireless Fidelity (Wi-Fi) network, a Local Area Network (LAN), a wireless personal area network (WPAN), a Wireless Local Area Network (WLAN), a wireless wide area network (WWAN), a cloud network, a Long Term Evolution (LTE) network, a plain old telephone service (POTS), a Metropolitan Area Network (MAN), and/or the Internet. Various devices in the exemplary network environment 100 may be configured to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, Long Term Evolution (LTE), Light Fidelity (Li-Fi), Internet of Things (IOT) communication protocols, and/or other cellular communication protocols or Bluetooth (BT) communication protocols, including variants thereof.

The video content 110 may comprise a sequence of image frames. The sequence of image frames may comprise at least a previous image frame and a current image frame. In accordance with an embodiment, the sequence of image frames of the video content 110 may be processed by the imaging device 102. This may be done for compression of the P-phase data values of a plurality of blocks representative of a plurality of pixels in the current image frame. In accordance with an embodiment, the sequence of image frames of the video content 110 may be processed by the server 106. In such a case, the imaging device 102 may transmit the video content 110 and the P-phase data values to the imaging device 102, via the communication network 108. The server 106 may process the P-phase data values and return the compressed P-phase data values to the imaging device 102, via the communication network 108. Examples of the video content 110 may include, but are not limited to, a pre-recorded video clip, a live multimedia recording, and/or audio-visual digital content captured in real time or near-real time.

In operation, the imaging device 102 may be configured to receive an input to capture an image or a sequence of image frames of the video content 110. The sequence of image frames may comprise at least a previous image frame and a current image frame. The imaging device 102 may be further configured to receive a plurality of blocks of P-phase data values from the image sensor 104. The received plurality of blocks may represent a plurality of pixels in the current image frame of the captured sequence of image frames. The imaging device 102 that include the image sensor 104 may be associated with digital Correlated Double Sampling (CDS) processing. The CDS processing may include a noise component and a true signal component. The noise component may be referred to as P-phase data, such as the received plurality of blocks of P-phase data values. The received plurality of blocks of P-phase data values may correspond to digital pixel reset values that represent reference voltages of the plurality of pixels in the current image frame. The true signal component may be referred to as D-phase data. The D-phase data values may also be concurrently received from the image sensor 104 at the time of the capture of an image or the sequence of image frames of the video content 110. D-phase data values may correspond to light dependent digital pixel values that represents signal voltages of the plurality of pixels in the current image frame. The difference between the received plurality of blocks of P-phase data values and the corresponding D-phase data values may be used to remove noise, such as the kTC noise, associated with the image or the sequence of image frames to be captured by the image sensor 104 of the imaging device 102. At the time of the capture of the image or the sequence of image frames, and in case of a rolling shutter type shutter mechanism of the imaging device 102, the received plurality of blocks of P-phase data values, may not be stored before the D-phase data values for the CDS. However, the CDS process, in case of a global shutter type of shutter mechanism of the imaging device 102, requires the noise component, such as the received plurality of blocks of P-phase data values, to be stored before the D-phase data values. In such a case, the P-phase data, such as the received plurality of blocks of P-phase data values, may need to be compressed to save memory or storage space of the imaging device 102.

The imaging device 102 may be configured to determine a predictor value for a first input block of P-phase data values. The first input block may correspond to one of the received plurality of blocks representative of the plurality of pixels in the current image frame. In accordance with an embodiment, the predictor value for the first input block of the P-phase data values may be determined based on an average value representative of the P-phase values of the first input block. The average value may correspond to an arithmetic mean of the P-phase data values of the first input block. The determination of the predictor value is described, for example, in details in FIG. 2 and FIG. 3A. In accordance with an embodiment, the predictor value may be determined based on a column-by-column average of a plurality of columns of P-phase data values (described in details, for example in FIG. 3B). The plurality of columns of P-phase data values may correspond to the previous image frame. In accordance with an embodiment, the predictor value may be determined based on application of a polynomial function on the column-by-column average (described in details, for example in FIG. 3C).

The imaging device 102 may be further configured to generate a reconstructed first block of P-phase data values, based on P-phase data values of the first input block and the determined predictor value. In accordance with an embodiment, the reconstructed first block may be generated based on a difference between each of the P-phase data values of the first input block and the determined predictor value. The P-phase data values in the generated reconstructed first block may correspond to compressed P-phase data values of the first input block.

The imaging device 102 may be further configured to update the determined predictor value for a second block of P-phase data values, based on the P-phase data values of the generated reconstructed first block. The second block may correspond to another block of the received plurality of blocks representative of pixels in the current image frame. In accordance with an embodiment, the determined predictor value may be updated based on an average value of the P-phase data values of the generated reconstructed first block. The imaging device 102 then generate a reconstructed second block of P-phase data values based on the second block of P-phase data values and the updated predictor value. Similar to the first block and the second block of P-phase data values, for each of the received plurality of blocks of P-phase data values, a corresponding reconstructed block may be generated by the imaging device 102. Consequently, compressed P-phase data values for the received plurality of blocks of P-phase data values may be generated.

With reference to FIG. 1B, there is shown a light-sensing element 104A, as a component of the image sensor 104. In accordance with an embodiment, the image sensor 104, included in the imaging device 102, may comprise a plurality of light-sensing elements, such as the light-sensing element 104A. The light-sensing element 104A may comprise a photodiode 114 and a plurality of transistors 116. The photodiode 114 may be configured to generate an output signal indicative of an intensity level of light impinging on the photodiode 114, and the plurality of transistors 116 may be configured to control reset, charge transfer, and row select operations of the plurality of light-sensing elements.

The imaging device 102 may be configured to compute a difference between the generated compressed P-phase data values and D-phase data values associated with the received plurality of blocks that represent the plurality of pixels in the current image frame. Based on the computed difference between the generated compressed P-phase data values and the D-phase data values, the imaging device 102 may be further configured to transform the current image frame into a refined current image frame. In accordance with an embodiment, the computed difference may be utilized to obtain the refined current image frame by removal of noise from the current image frame.

In accordance with an embodiment, the computed difference may correspond to cancellation of the P-phase data values from corresponding D-phase data values for each of the plurality of light-sensing elements. This may be done to generate correlated double sampling (CDS) corrected digital output pixel values in the refined current image frame. In accordance with an embodiment, the P-phase data values received from the image sensor 104 may be processed prior to processing of the D-phase data values to enable storage of the received P-phase data values as the generated compressed P-phase data values in a memory unit (not shown) of the imaging device 102.

In accordance with another aspect of the disclosure, the imaging device 102 may be configured to transmit the received plurality of blocks of the P-phase data values from the image sensor 104. The server 106 may be configured to determine the predictor value of the first input block of the P-phase data values. The server 106 may be further configured to generate the reconstructed first block of P-phase data values, based on the P-phase data values of the first input block and the determined predictor value. The server 106 may be further configured to update the determined predictor value for the second block of P-phase data values, based on the P-phase data values of the generated reconstructed first block. The server 106 may be further configured to generate the compressed P-phase data values that correspond to the received plurality of blocks of P-phase data values, based on the reconstructed first block and at least the reconstructed second block. The reconstructed second block is generated based on the second block of P-phase data values and the updated predictor value. The server 106 may be further configured to transmit the generated compressed P-phase data values to the imaging device 102, via the communication network 108.

Figure 2:
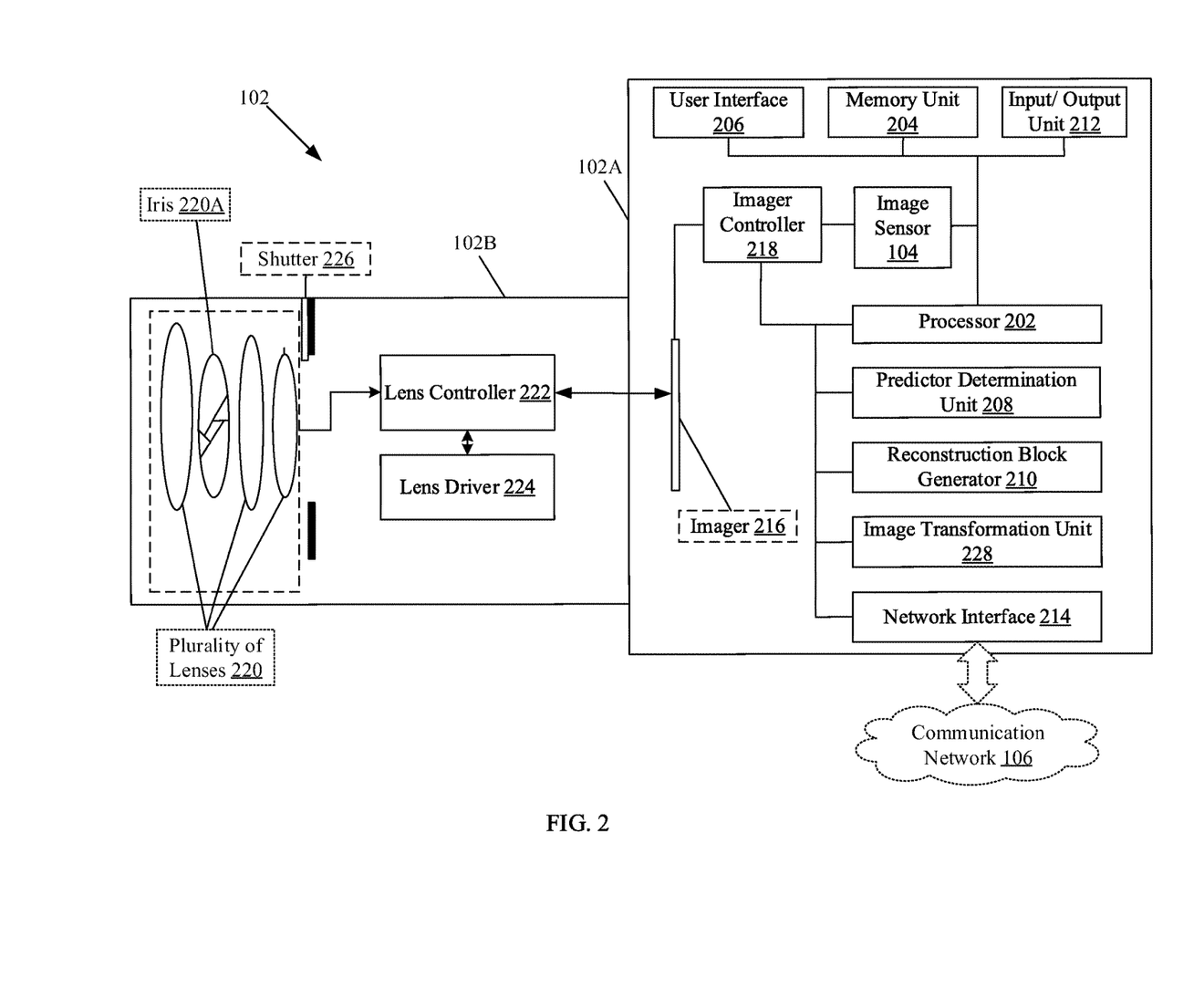
FIG. 2 illustrates a block diagram of an imaging device, in accordance with an embodiment of the disclosure.

FIG. 2 illustrates a block diagram of an imaging device, in accordance with an embodiment of the disclosure. FIG. 2 is explained in conjunction with elements from FIG. 1A. With reference to FIG. 2, there is shown the imaging device 102, which may include a processing circuitry section 102A and an incoming light control section 102B. The processing circuitry section 102A may include one or more circuits configured for the P-phase data compression. The one or more circuits may include a processor 202, a memory unit 204, a user interface (UI) 206, a predictor determination unit 208, a reconstruction block generator 210, one or more input/output (I/O) units, such as an (I/O) unit 212, and a network interface 214. The communication network 108 (FIG. 1A) is shown associated with the network interface 214. The processing circuitry section 102A may further include an imager 216, controlled by an imager controller 218, an image sensor, such as the image sensor 104, and an image transformation unit 228. The incoming light control section 102B may include a plurality of lenses 220, controlled by a lens controller 222 and a lens driver 224. The plurality of lenses 220 may include an iris 220A. A shutter 226 is also shown in the incoming light control section 102B.

With reference to FIG. 2, the one or more circuits, such as the processor 202, the memory unit 204, the UI 206, the predictor determination unit 208, the reconstruction block generator 210, the I/O unit 212, the network interface 214, and the image transformation unit 228, may be directly or indirectly coupled to each other. The output of the image sensor 104 may be provided to the predictor determination unit 208, in conjunction with the processor 202. The output of the predictor determination unit 208 may be further provided to the reconstruction block generator 210, in conjunction with the processor 202. Further, the output of the reconstruction block generator 210 may be provided to the I/O unit 212. The network interface 214 may be configured to communicate with the exemplary server, such as the server 106, via the communication network 108.

In accordance with an embodiment, the imager 216 may be communicatively coupled to the image sensor, such as the image sensor 104. The plurality of lenses 220 may be in connection with the lens controller 222 and the lens driver 224. The plurality of lenses 220 may be controlled by the lens controller 222, in conjunction with the processor 202. In accordance with an embodiment, the processing circuitry section 102A of the imaging device 102 may be implemented in an exemplary server, such as the server 106, without deviation from the scope of the disclosure.

The processor 202 may comprise suitable logic, circuitry, interfaces, and/or code that may be configured to execute a set of instructions stored in the memory unit 204. The processor 202 may be further configured for P-phase data compression in an image or a sequence of image frames captured by the imaging device 102. The processor 202 may be implemented based on a number of electronic control unit technologies known in the art. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processors.

The memory unit 204 may comprise suitable logic, circuitry, and/or interfaces that may be configured to store a machine code and/or a set of instructions with at least one code section executable by the processor 202. The memory unit 204 may be further configured to store one or more images and the video content 110 captured by the imaging device 102. The memory unit 204 may be further configured to store operating systems and associated applications of the imaging device 102. Examples of implementation of the memory unit 204 may include, but are not limited to, Random Access Memory (RAM), Read Only Memory (ROM), a processor cache, Hard Disk Drive (HDD), Flash memory, and/or a Secure Digital (SD) card.

The UI 206 may comprise suitable interfaces that may be rendered on the I/O unit 212 of the imaging device 102. The UI 206 may present a video, such as the video content 110, captured by the imaging device 102. The UI 206 may further present refined image frames generated by the imaging device 102.

The predictor determination unit 208 may comprise suitable logic, circuitry, and/or interfaces that may be configured to determine a predictor for each of a plurality of blocks of P-phase data values received from the image sensor 104. The predictor determination unit 208 may be implemented as a separate processor or circuitry in the imaging device 102. The predictor determination unit 208 and the processor 202 may be implemented as an integrated processor or a cluster of processors that perform the functions of the predictor determination unit 208 and the processor 202. The predictor determination unit 208 may be implemented as a set of instructions stored in the memory unit 204, which upon execution by the processor 202, may perform the functions and operations of the imaging device 102.

The reconstruction block generator 210 may comprise suitable logic, circuitry, and/or interfaces that may be configured to generate reconstructed blocks of P-phase data values for each of the plurality of blocks of P-phase data values received from the image sensor 104. The reconstruction block generator 210 may be implemented as a separate processor or circuitry in the imaging device 102. The reconstruction block generator 210 and the processor 202 may be implemented as an integrated processor or a cluster of processors that perform the functions of the reconstruction block generator 210 and the processor 202. The reconstruction block generator 210 may be implemented as a set of instructions stored in the memory unit 204, which on execution by the processor 202 may perform the functions and operations of the imaging device 102.

The I/O unit 212 may comprise suitable logic, circuitry, interfaces, and/or code that may be configured to control presentation of the refined images and the compressed P-phase data values on a display screen. The display screen may be realized through several known technologies, such as, but are not limited to, Liquid Crystal Display (LCD) display, Light Emitting Diode (LED) display, and/or Organic LED (OLED) display technology. The I/O device 212 may comprise various input and output devices that may be configured to communicate with the processor 202. Examples of the input devices or input mechanisms may include, but are not limited to, a shutter button, a record button on the imaging device 102 (such as a camera), a software button presented on the UI 206 of the imaging device 102, a touch screen, a microphone, a motion and/or gesture sensor, and/or a light sensor. Examples of the output devices may include, but are not limited to, a display screen, a projector screen, and/or a speaker.

The network interface 214 may comprise suitable logic, circuitry, interfaces, and/or code that may be configured to communicate with one or more cloud resources, such as the server 106 (as shown in FIG. 1A), via the communication network 108 (as shown in FIG. 1A). The network interface 214 may implement known technologies to support wired or wireless communication of the imaging device 102 with the communication network 108. Components of the network interface 214 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The imager 216 may comprise suitable circuitry and/or interfaces that may be configured to transform images from analog light signals into a series of digital pixels without any distortion. Examples of implementation of the imager 216 may include, but are not limited to, Charge-Coupled Device (CCD) imagers or Complementary Metal-Oxide-Semiconductor (CMOS) imagers, or a combination thereof.

The imager controller 218 may comprise suitable logic, circuitry, and/or interfaces that may be configured to control orientation or direction of the imager 216, based on the instructions received from the processor 202. The imager controller 218 may be implemented by utilizing various technologies that are well known to those skilled in the art.

The plurality of lenses 220 may correspond to an optical lens or assembly of lenses, used in conjunction with a camera body, such as the body of the imaging device 102, and mechanism to capture image frames. The image frames may be captured either on photographic film or other media that is capable to store an image chemically or electronically.

The lens controller 222 may comprise suitable logic, circuitry, and/or interfaces that may be configured to control various characteristics, such as zoom, focus, or aperture, of the plurality of lenses 220. The lens controller 222 may integrated as part of the imaging device 102, or may be a stand-alone unit, in conjunction with the processor 202. In case of the stand-alone unit, the lens controller 222 and/or the plurality of lenses 220, for example, may be implemented as a removable attachment to the imaging device 102. The lens controller 222 may be implemented by use of several technologies that are well known to those skilled in the art.

The lens driver 224 may comprise suitable logic, circuitry, and/or interfaces that may be configured to perform zoom and focus control and iris control, based on instructions received from the lens controller 222. The lens driver 224 may be implemented by use of several technologies that are well known to those skilled in the art.

The shutter 226 may allow light to pass for a determined or particular period, exposing the imager 216 to light in order to capture a plurality of image frames. The shutter may be of a global shutter type. The P-phase data, such as the plurality of blocks of P-phase data values, are received prior to the receipt of the D-phase data values in case of the global shutter type of shutter 226. Consequently, the CDS process in case of the global shutter type of shutter 226 requires the noise component, such as the received plurality of blocks of P-phase data values, to be stored before the D-phase data values.

The image transformation unit 228 may comprise suitable logic, circuitry, and/or interfaces that may be configured to transform the current image frame to a refined current image frame by removal of noise from the current image frame. The image transformation unit 228 may be implemented as a separate processor or circuitry in the imaging device 102. The image transformation unit 228 and the processor 202 may be implemented as an integrated processor or a cluster of processors that perform the functions of the image transformation unit 228 and the processor 202. The image transformation unit 228 may be implemented as a set of instructions stored in the memory unit 204, which on execution by the processor 202 may perform the functions and operations of the imaging device 102.

In operation, the processor 202 may be configured to receive an input to capture an image or a sequence of image frames of a video content, such as the video content 110. The sequence of image frames may be captured through the plurality of lenses 220 by use of the image sensor 104. The plurality of lenses 220 may be controlled by the lens controller 222 and the lens driver 224, in conjunction with the processor 202. The plurality of lenses 220 may be controlled based on an input signal received from a user. The input signal may be provided by the user, via a selection of a graphical button rendered on the UI 206 or a button-press event of a hardware button available at the imaging device 102. Alternatively, the imaging device 102, may retrieve the sequence of image frames pre-stored in the memory unit 204.

The processor 202 may be configured to receive the plurality of blocks of P-phase data values from the image sensor 104. The received plurality of blocks may represent a plurality of pixels in the current image frame of the captured sequence of image frames. The predictor determination unit 208 may be configured to determine a predictor value for a first input block of P-phase data values. The first input block may correspond to one of the received plurality of blocks representative of the plurality of pixels in the current image frame.

In accordance with an embodiment, the predictor value for the first input block of the P-phase data values may be determined based on an average of the P-phase values of the first input block. The first input block corresponds to one of the received plurality of blocks representative of the plurality of pixels in the current image frame. The determination of the predictor value is explained, for example, in FIGS. 3A, 3B, and 3C.

Figure 3A:
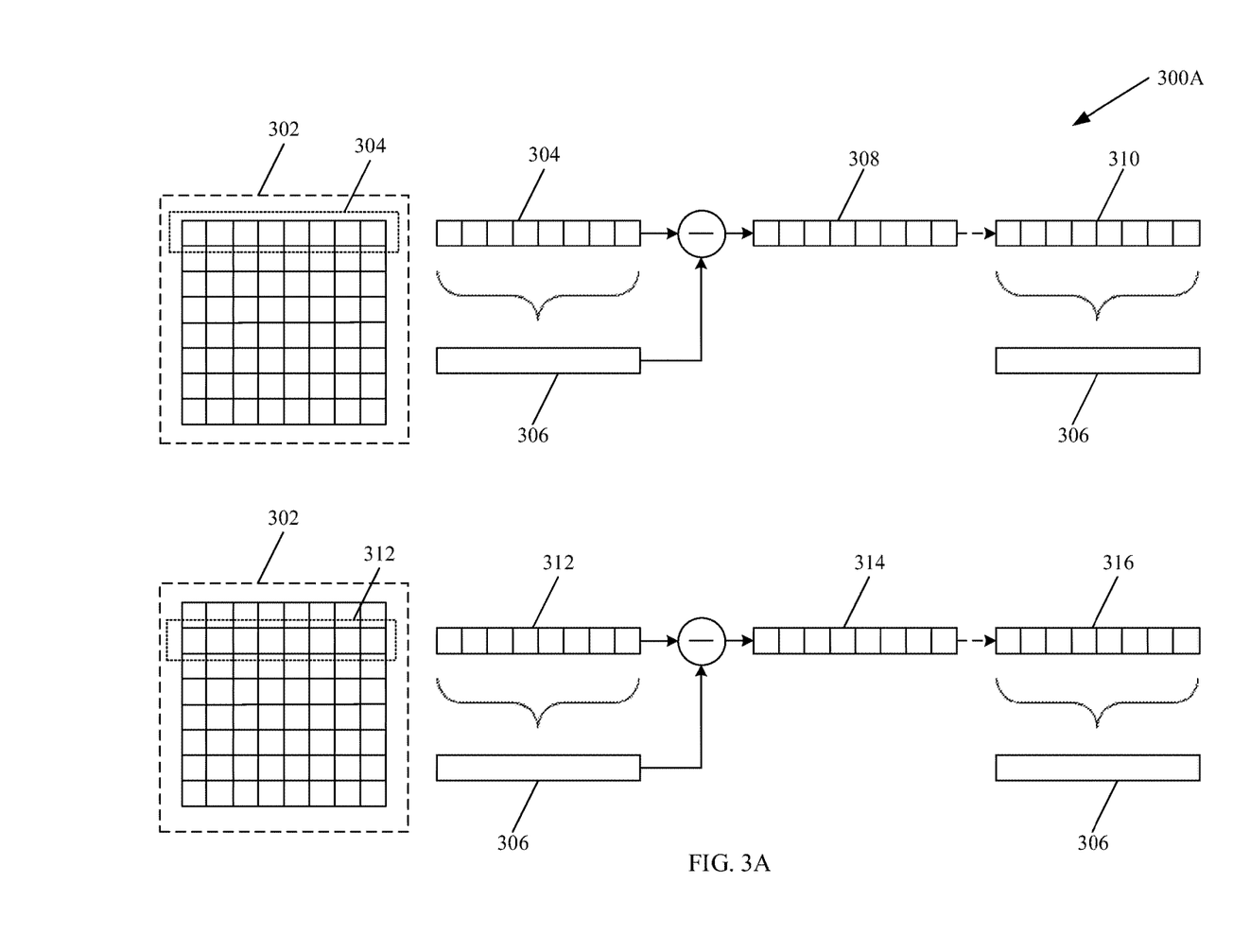
FIGS. 3A, 3B, and 3C, collectively, illustrate exemplary scenarios for implementation of the disclosed device and method for P-phase data compression in an imaging device, in accordance with an embodiment of the disclosure.
Figure 3B:
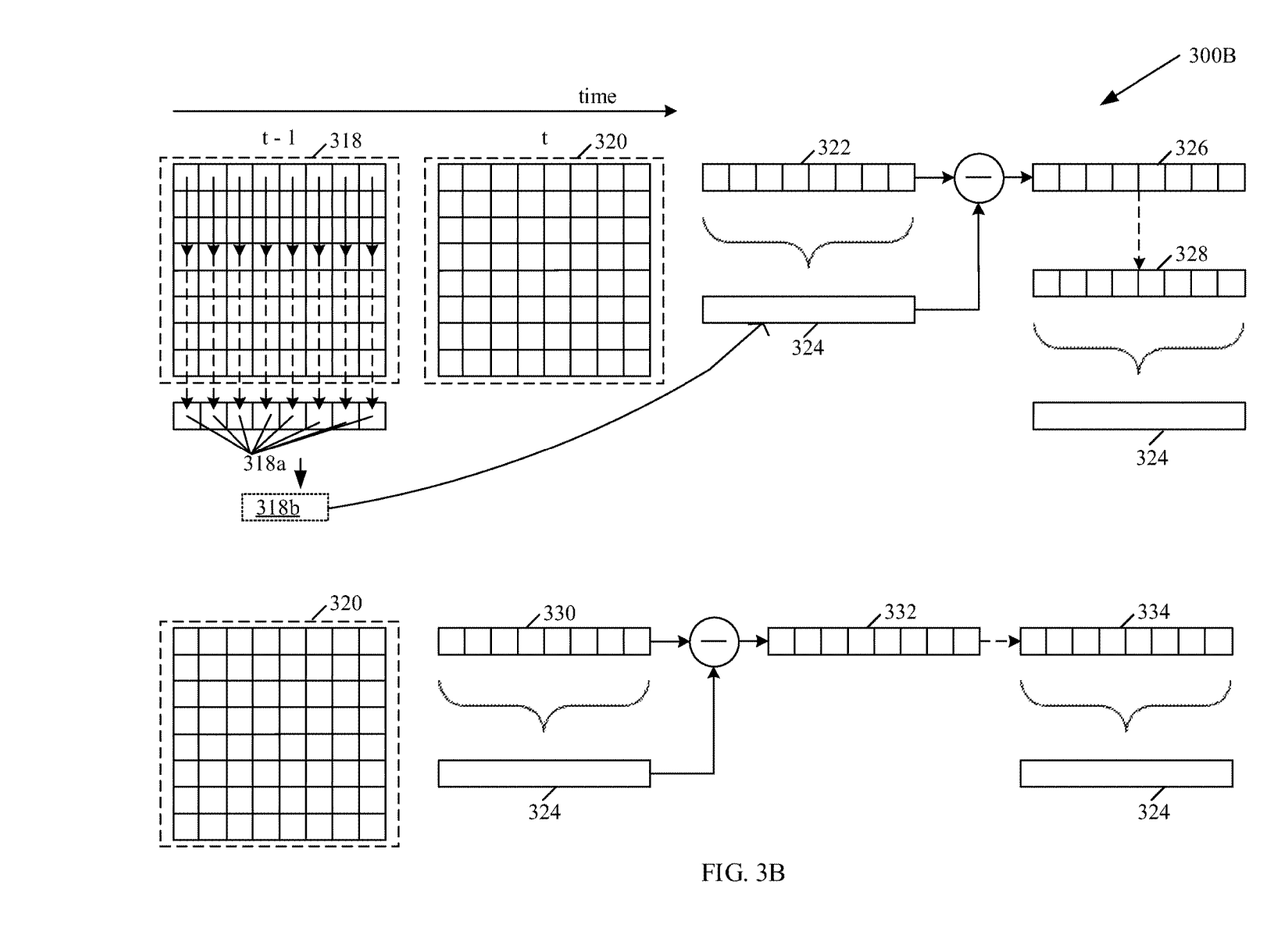
Figure 3C:
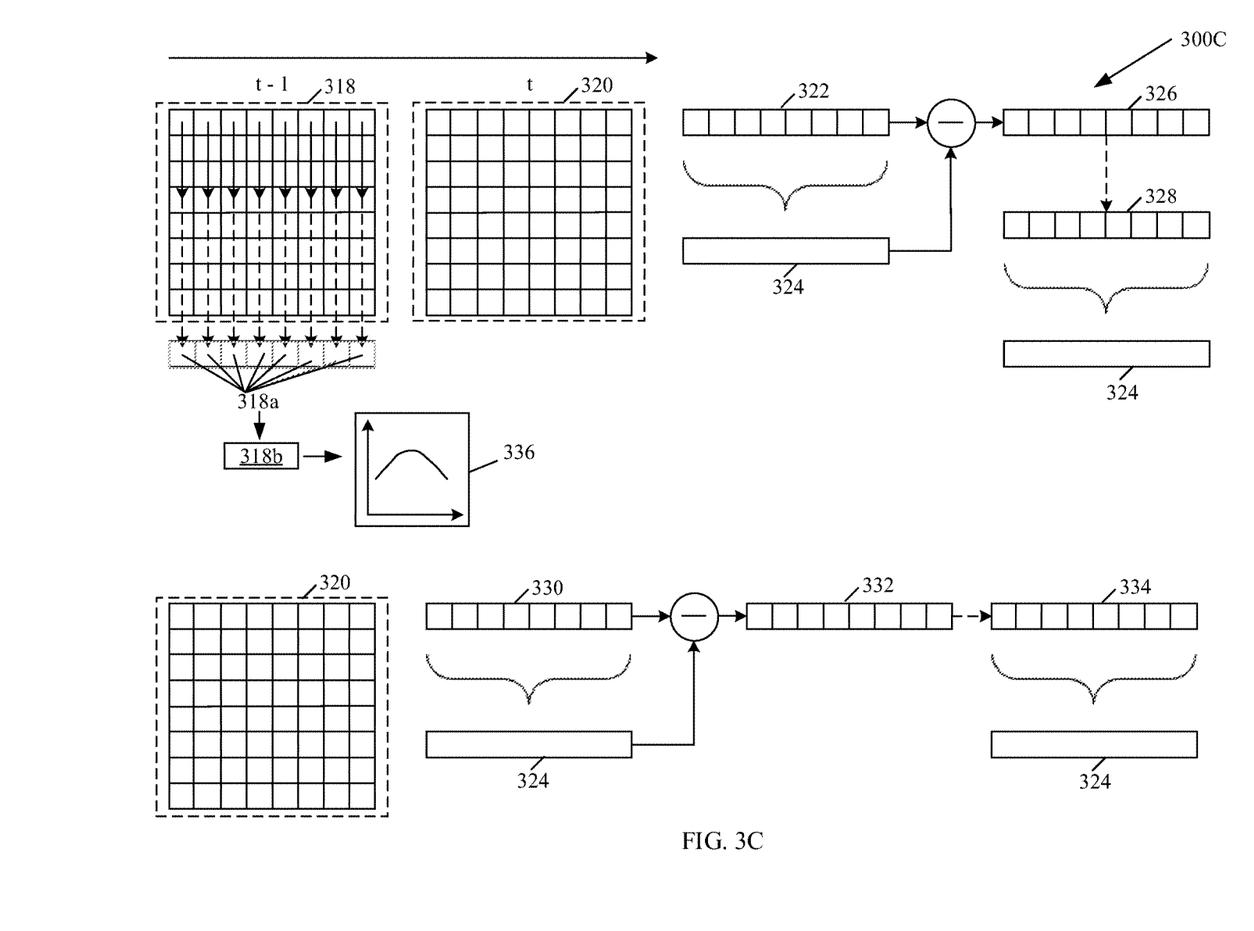

FIGS. 3A to 3C, collectively, illustrate exemplary scenarios for implementation of the disclosed imaging device and method for P-phase data compression, in accordance with an embodiment of the disclosure. FIGS. 3A to 3C are described in conjunction with elements from the FIGS. 1 and 2.

With reference to FIG. 3A, there is shown an exemplary scenario 300A for P-phase data compression. FIG. 3A is explained in conjunction with elements from FIG. 1A and FIG. 2. With reference to exemplary scenario 300A, there is shown an exemplary block 302, a first input block 304, a resultant predictor block 306, a first residual block 308, a reconstructed first block 310, a second input block 312, a second residual block 314, and a reconstructed second block 316. The exemplary block 302 includes eight-by-eight blocks of P-phase data values received by the processor 202 from the image sensor 104. Each of the eight-by-eight (8×8) blocks of the exemplary block 302 may correspond to pixels in a current image frame of the sequence of image frames captured by a camera, such as the imaging device 102. In other words, each 1×1 block (or box) in the FIG. 3A may denote a pixel and the 8×8 blocks denote a picture, such as the current image frame. The first input block 304 corresponds to the first row of the eight-by-eight blocks of the exemplary block 302. The second input block 312 corresponds to the second row of the eight-by-eight blocks of the exemplary block 302.

The predictor determination unit 208 may be configured to determine a predictor value for the P-phase data values of the first input block 304. In accordance with the exemplary scenario 300A, the predictor value for the first input block 304 may be determined based on an average the P-phase data values of the first input block 304. The predictor value of the first input block 304 may be stored in the resultant predictor block 306. For example, the original P-phase data values of the first input block 304 may be 1690, 1676, 1669, 1656, 1681, 1680, 1677, and 1654 sequentially in that order. The first input block 304 refers to the first row of the of the eight-by-eight blocks of the exemplary block 302. In this case, the predictor value for the first input block 304 is 1672, which is the block average of the original P-phase data values. This predictor value "1672" may then be stored in the resultant predictor block 306.

The reconstruction block generator 210 may be configured to receive the determined predictor value from the predictor determination unit 208. The reconstruction block generator 210 may be configured to compute a difference between each of the P-phase data values of the first input block 304 and the determined predictor value. The values that corresponds to the computed difference between each of the P-phase data values of the first input block 304 and the determined predictor value may be stored in the residual block 308. The values that corresponds to the computed difference between each of the P-phase data values of the first input block 304 and the determined predictor value may also be referred to as residual. For example, the values in the residual block 308 may be 18, 4, −3, −16, 9, 8, 5, and −18 in that order. In this case, the difference between 1690 (original P-phase data value) and 1672 (the predictor value) =18 (the first residual value of the residual block 308). Similarly, 1676 (another original P-phase data value)− 1672=4 (the second residual value of the residual block 308). Thus, in this manner, the values in the residual block 308 may be computed. Unlike the conventional DPCM based compression method, where difference between two consecutive values of a block may be computed for compression purpose, the use of a unique predictor value for each block is advantageous for data that exhibit noise-like characteristics, such as the P-phase data values.

The reconstruction block generator 210 may be configured to further encode the values in the residual block 308 to generate the reconstructed first block 310. In accordance with an embodiment, the values in the residual block 308 and the determined predictor value may be further encoded by one or more entropy encoding techniques. Thus, it may be alternatively stated that the reconstruction block generator 210 may be configured to generate the reconstructed first block 310, based on the P-phase data values of the first input block 304 and the determined predictor value stored in the resultant predictor block 306. The P-phase data values in the generated reconstructed first block 310 may correspond to compressed P-phase data values of the first input block 304. As the predictor value used for the first input block 304 is the predictor value determined from the original P-phase data values of the same block (average of the P-phase data values of the first block 310), this coding of the first input block 304 may also be referred to as intra-block coding of the P-phase data values and an intra-prediction of the predictor value. Further, signaling of the compressed predictor value for the first input block 304 may be required in the compressed bit stream of the P-phase data values to enable decoding.

The predictor determination unit 208 may be further configured to update the determined predictor value stored in the resultant predictor block 306 for the second block 312 of P-phase data values, based on the P-phase data values of the generated reconstructed first block 310. In accordance with an embodiment, the determined predictor value stored in the resultant predictor block 306 may be updated based on an average value of the P-phase data values of the generated reconstructed first block 310. The processor 202 may be further configured to store the updated predictor value in the resultant predictor block 306.

Similar to the first input block 304, the reconstruction block generator 210 may be further configured to generate the reconstructed second block 316 based on the P-phase data values of the second input block 312 and the updated predictor value stored in the resultant predictor block 306. The reconstruction block generator 210 may receive the updated predictor value from the predictor determination unit 208. As the predictor value used for the second input block 312 is the updated predictor value determined from the previous block (average value of the P-phase data values of the generated reconstructed first block 310), this may also be referred to as inter-block coding of the P-phase data values and an inter-prediction of the predictor value. Further, signaling of the updated predictor value may not be required for the second input block 312, and all subsequent blocks of the eight-by-eight blocks of the exemplary block 302 of the P-phase data values.

In accordance with an embodiment, the reconstructed second block 316 may be generated based on encoding of the values of the residual block 314. Similar to the values of the residual block 308, the values of the residual block 314 are computed based on a difference between each of the P-phase data values of the second block 312 and the updated predictor value stored in the resultant predictor block 306. The P-phase data values in the generated reconstructed second block 316 may correspond to compressed P-phase data values of the second block 312.

The predictor determination unit 208 may be configured to further update the determined predictor value stored in the resultant predictor block 306 for a next block of P-phase data values of the exemplary block 302, based on the P-phase data values of the reconstructed previous block, such as the generated reconstructed second block 310. Similar to the reconstructed first block 310 and the reconstructed second block 316, the reconstruction block generator 210 may be configured to generate compressed P-phase data values of the exemplary block 302 received from the image sensor 104.

Furthermore, the processor 202 may be configured to compute a difference between the generated compressed P-phase data values and D-phase data values associated with the exemplary block 302 received from the image sensor 104. The exemplary block 302 that may include, for example, eight-by-eight blocks of P-phase data values may be representative of the corresponding pixels in the current image frame. Based on the computed difference between the generated compressed P-phase data values and the D-phase data values, the image transformation unit 228 may be configured to transform the current image frame to a refined current image frame. In other words, it may be understood that the computed difference may be utilized for removal of noise from the current image frame to obtain the refined current image frame.

With reference to FIG. 3B, there is shown another exemplary scenario 300B for P-phase data compression. FIG. 3B is explained in conjunction with elements from FIG. 1A and FIG. 2. With reference to exemplary scenario 300B, there is shown a first exemplary block 318, a second exemplary block 320, a first input block 322, a resultant predictor block 324, a first residual block 326, a reconstructed first block 328, a second input block 330, a second residual block 332, and a reconstructed second block 334. The first exemplary block 318 and the second exemplary block 320 include eight-by-eight blocks of P-phase data values received by the processor 202 from the image sensor 104. Each of the eight-by-eight blocks of the first exemplary block 318 may represent corresponding pixels in a previous image frame taken at a time instance "t−1". A plurality of average values 318a of P-phase data values and a final average value 318b of the plurality of average values 318a are also shown. Each of the eight-by-eight blocks of the second exemplary block 320 may represent corresponding pixels in a current image frame taken at a time instance "t" of a sequence of image frames captured by the imaging device 102. The first input block 322 corresponds to the first row of the eight-by-eight blocks of the second exemplary block 320. The second input block 330 corresponds to the second row of the eight-by-eight blocks of the second exemplary block 320.

The predictor determination unit 208 may be configured to determine a predictor value for the P-phase data values of the first input block 322. In accordance with the exemplary scenario 300B, the predictor value for the first input block 322 may be determined based on the final average value 318b of the plurality of average values 318a of P-phase data values. An average value of the P-phase data values for a first column of the plurality of columns of the first exemplary block 318, may be computed. Similarly, for each of the plurality of columns of the first exemplary block 318, an average value may be computed. These average values may correspond to the plurality of average values 318a for the plurality of columns of the first exemplary block 318. In other words, the plurality of average values 318a may be column-by-column average of the plurality of columns of the first exemplary block 318. The final average value 318b may be an average of the plurality of average values 318a. Thus, the final average value 318b of the first exemplary block 318, which corresponds to the previous image frame, may be taken as the predictor value for the first input block 322 of the second exemplary block 320, which corresponds to the current image frame. Thus, the determined predictor value may be referred to as a global predictor derived from the entire first exemplary block 318. The determined predictor value for the first input block 322 may be stored in the resultant predictor block 324. After the determination of the predictor value for the first input block 322, the values for the first residual block 326 may be computed based on the P-phase data values of the first input block 322 and the determined predictor value stored in the resultant predictor block 324. The computation of the values for the first residual block 326 and the generation of the reconstructed first block 328 may be similar to the generation of the reconstructed first block 310, as described, for example, in the FIG. 3A. Further, the predictor determination unit 208 may be further configured to update the determined predictor value stored in the resultant predictor block 324 for the second input block 330 of P-phase data values, based on the P-phase data values of the generated reconstructed first block 328. The computation of the values for the second residual block 332 and the generation of the reconstructed second block 334 may be similar to the computation of values of the second residual block 314 and the generation of the reconstructed second block 316, respectively as described, for example, in the FIG. 3A. The reconstruction block generator 210 may generate the compressed P-phase data values associated with the second exemplary block 320 received from the image sensor 104, based on the reconstructed first block 328, the second reconstructed block 334, and other reconstructed blocks of the second exemplary block 320. Further, the image transformation unit 228 may then transform the current image frame to a refined current image frame based on a computed difference between the generated compressed P-phase data values and the D-phase data values.

With reference to FIG. 3C, there is shown another exemplary scenario 300C for P-phase data compression. FIG. 3C is explained in conjunction with FIGS. 1, 2, 3A and 3B. With reference to exemplary scenario 300C, there is shown a graphical polynomial representation 336 in addition to the various elements of the FIG. 3B. In accordance with the exemplary scenario 300C, the predictor value for the first input block 322 may be determined based on application of a polynomial function, as shown by the graphical polynomial representation 336, of the final average value 318b of the plurality of average values 318a of the P-phase data values. The polynomial function may be represented by the mathematical expression (1) as given below.

$$Y=A*X^2+B*X+C \qquad (1),$$

Where Y=Predictor value;
X=column position associated with the final average value 318b of the plurality of average values 318a, which represent column-by-column average of the plurality of columns of the first exemplary block 318; and
A, B, and C may be constants determined for a particular image sensor, such as the image sensor 104, where $A=-4.17*10^{-6}$; $B=1.77*10^{-2}$; and $C=1801.0$. The constant values for A, B, and C may be adjusted or modified for different image sensors and may be the same, or may be different from the constant values for the image sensor 104.

In accordance with an embodiment, the polynomial function represented by the mathematical expression (1) may be, for example, a quadratic polynomial based approximation of the final average value 318b of the plurality of average values 318a of the P-phase data values. In this regard, the predictor value for the first input block 322 may be determined based on the quadratic polynomial based approximation of the final average value 318b, by use of the mathematical expression (1). The determined predictor value for the first input block 322 may be stored in the resultant predictor block 324. The determined predictor value of the first exemplary block 318, which corresponds to the previous image frame, may be taken as the predictor value for the first input block 322 of the second exemplary block 320, which corresponds to the current image frame. Thus, the determined predictor value may be referred to as a model-based global predictor derived from the entire first exemplary block 318. The determined predictor value for the first input block 322 may be stored in the resultant predictor block 324. After the determination of the predictor value for the first input block 322, the values for the first residual block 326 may be computed based on the P-phase data values of the first input block 322 and the determined predictor value stored in the resultant predictor block 324. The computation of the values for the first residual block 326 and the generation of the reconstructed first block 328 may be similar to the generation of the reconstructed first block 310, as described, for example, in the FIG. 3A and FIG. 3B. Further, the predictor determination unit 208 may be further configured to update the determined predictor value stored in the resultant predictor block 324 for the second input block 330 of P-phase data values, based on the P-phase data values of the generated reconstructed first block 328. The computation of the values for the second residual block 332 and the generation of the reconstructed second block 334 may be similar to the computation of values of the second residual block 314 and the generation of the reconstructed second block 316, respectively as described, for example, in the FIG. 3A. The reconstruction block generator 210 may generate the compressed P-phase data values associated with the second exemplary block 320 received from the image sensor 104, based on the reconstructed first block 328, the second reconstructed block 334, and other reconstructed blocks of the second exemplary block 320. Further, the image transformation unit 228 may then transform the current image frame to a refined current image frame based on a computed difference between the generated compressed P-phase data values and the D-phase data values.

Figure 4:
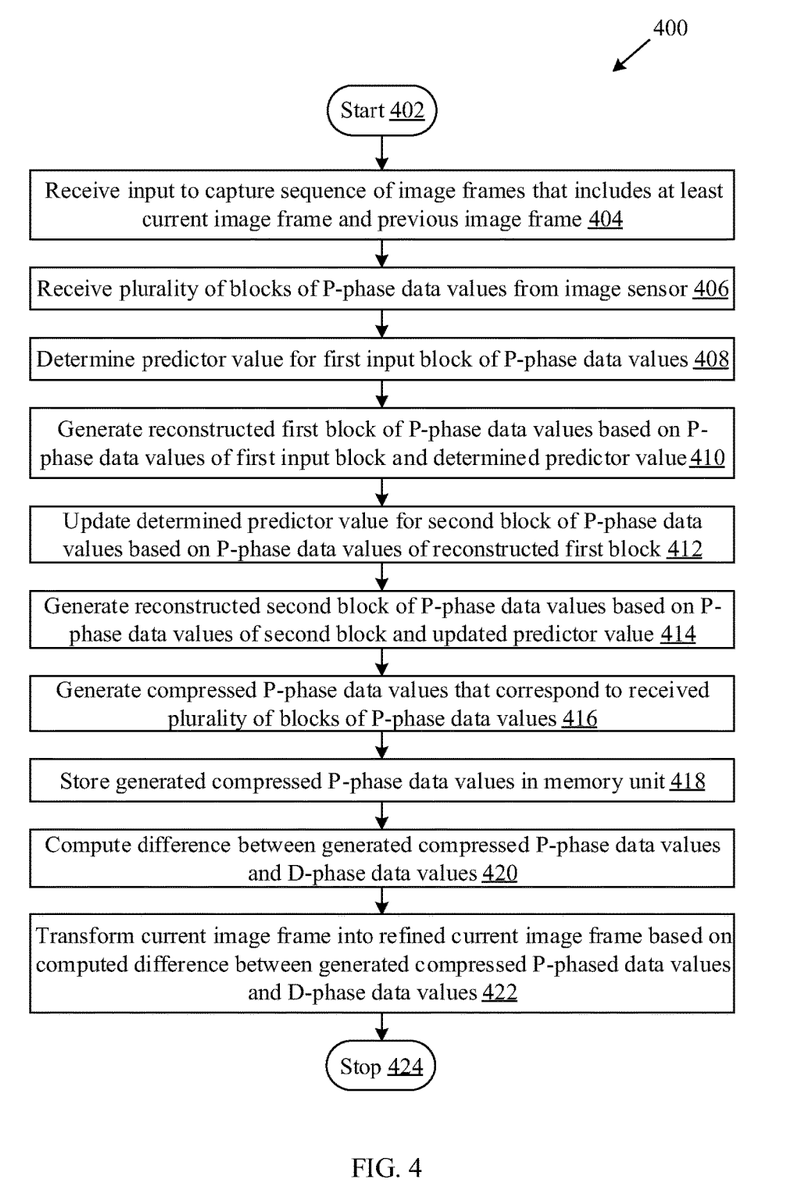
FIG. 4 depicts a flow chart that illustrates an exemplary operations for P-phase data compression in an imaging device, in accordance with an embodiment of the disclosure.

FIG. 4 depicts a flow chart that illustrates an exemplary operations for P-phase data compression in an imaging device, in accordance with an embodiment of the disclosure. With reference to FIG. 4, there is shown a flowchart 400. The flowchart 400 is described in conjunction with FIG. 2. The exemplary operations starts at 402 and proceeds to 404.

At 404, an input may be received by the imaging device 102 to capture a sequence of image frames. The sequence of image frames may comprise at least the current image frame and the previous image frame.

At 406, a plurality of blocks of P-phase data values may be received from the image sensor 104. The processor 202 may be configured to receive the plurality of blocks of P-phase data values from the image sensor 104. The received plurality of blocks may represent a plurality of pixels in the current image frame at the time of capture of the sequence of image frames by the imaging device 102.

At 408, a predictor value for a first input block of P-phase data values may be determined. The predictor determination unit 208 may be configured to receive the first input block of the P-phase data values that may correspond to one of the received plurality of blocks of P-phase data values. In accordance with an embodiment, the predictor value for the first input block of the P-phase data values may be determined based on an average value representative of the P-phase values of the first input block, as described, for example, in FIG. 2 and FIG. 3A. In accordance with an embodiment, the predictor value for the first input block of the P-phase data values may be determined based on the final average value of the plurality of average P-phase data values, as described, for example, in FIG. 2 and FIG. 3B. The plurality of average values may be the column-by-column average of the plurality of columns that correspond to another plurality of blocks representative of the plurality of pixels in the previous image frame. In accordance with an embodiment, the predictor value for the first input block of the P-phase data values may be determined based on application of the polynomial function based on the final average value of the plurality of average values of the P-phase data values, as described, for example, in FIG. 2 and FIG. 3C.

At 410, a reconstructed first block of P-phase data values may be generated based on the P-phase data values of the first input block and the determined predictor value. The reconstruction block generator 210 may be configured to generate the reconstructed first block of P-phase data values, based on the P-phase data values of the first input block and the determined predictor value. The reconstructed first block may be generated based on a difference between each of the P-phase data values of the first input block and the determined predictor value, as described, for example, in FIG. 2. In accordance with an embodiment, the P-phase data values in the generated reconstructed first block correspond to compressed P-phase data values of the first input block.

At 412, the determined predictor value may be updated for a second block of P-phase data values based on the P-phase data values of the generated reconstructed first block. The predictor determination unit 208 in conjunction with the reconstruction block generator 210 may be configured to update the determined value for a second block of P-phase data values based on the P-phase data values of the generated reconstructed first block. In accordance with an embodiment, the determined predictor value may be updated based on an average value of the P-phase data values of the generated reconstructed first block.

At 414, a reconstructed second block of P-phase data values may be generated based on the second block of P-phase data values and the updated predictor value. The reconstruction block generator 210 may be further configured to generate the reconstructed second block of P-phase data values based on the second block of P-phase data values and the updated predictor.

At 416, compressed P-phase data values that correspond to the received plurality of blocks may be generated. The reconstruction block generator 210 may be configured to generate compressed P-phase data values that correspond to the received plurality of blocks of P-phase data values, based on the reconstructed first block and at least the reconstructed second block.

At 418, the generated compressed P-phase data values may be stored in the memory unit 204. The reconstruction block generator 210 may be configured to store compressed P-phase data values in the memory unit 204 of the imaging device 102.

At 420, a difference between the generated compressed P-phase data values and D-phase data values may be computed. The processor 202 may be configured to compute the difference between the generated compressed P-phase data values and the D-phase data values associated with the received plurality of blocks representative of the plurality of pixels in the current image frame. In accordance with an embodiment, the P-phase data values may correspond to digital pixel reset values that represent reference voltages of the plurality of pixels in the current image frame. The D-phase data values may correspond to light dependent digital pixel values that represents signal voltages of the plurality of pixels in the current image frame.

At 422, the current image frame may be transformed into a refined current image frame. The image transformation unit 228 may be configured to transform the current image frame to the refined current image frame, based on the computed difference between the generated compressed P-phase data values and the D-phase data values. The computed difference may be utilized for removal of noise from the current image frame to obtain the refined current image frame. Control passes to end 424.

In accordance with an embodiment of the disclosure, an imaging device for P-phase data compression is disclosed. The imaging device 102 (FIG. 1A) may be configured to capture a video content, such as the video content 108. The video content may include a sequence of image frames. The imaging device 102 may comprise one or more circuits that may be configured to receive a plurality of blocks of P-phase data values from an image sensor, such as the image sensor 104. The imaging device 102 may further comprise one or more circuits, such as the predictor determination unit 208 (FIG. 2), that may be configured to determine a predictor value for a first input block of P-phase data values. The one or more circuits, such as the reconstruction block generator 210 (FIG. 2), may be configured to generate a reconstructed first block of P-phase data values based on the P-phase data values of the first input block and the determined predictor value. The one or more circuits, such as the predictor determination unit 208, may be configured to update the determined predictor value for a second block of P-phase data values, based on the P-phase data values of the generated reconstructed first block. Further, the one or more circuits, such as the reconstruction block generator 210, may be configured to generate compressed P-phase data values that correspond to the received plurality of blocks of P-phase data values, based on the reconstructed first block and at least a reconstructed second block. The reconstructed second block is generated based on the second block of P-phase data values and the updated predictor value.

The compressed P-phase data values that correspond to the received plurality of blocks of P-phase data values, may be stored in the memory unit 204 before the D-phase data is actually received from an image sensor, such as the image sensor 104, for the CDS process. The compressed P-phase data values may be stored prior to the receipt of the D-phase data in case of usage of the global shutter by imaging device 102 for capture of the sequence of images. The compression of the P-phase data values saves storage space of the imaging device 102. Alternatively stated, with the same hardware or storage space, more image or video data may be captured and stored in the imaging device 102 as a result of the compression of the P-phase data values. Further, the reconstruction block generator 210 ensures that the kTC noise for the image sensor 104 remains constant while there is a reduction of the additional noise incurred due to P-phase data compression. Further, conventional compression methods for low-complexity compression may include DPCM. DPCM may be effective for image compression, after an image is captured and where the captured image has adjacent pixel intensity values that are highly similar to each other. Unlike the conventional DPCM based compression method, where difference between two consecutive values of a block may be computed for compression purpose, the use of a unique predictor value for each block as determined by predictor determination unit 208 is advantageous for data that exhibit noise-like characteristics, such as the P-phase data values. For data that exhibit noise-like characteristics, such as the P-phase data, the DPCM based compression method may not be effective for compression as adjacent P-phase data values may not exhibit high similarity or uniformity. Further, in addition to efficient compression of the P-phase data associated with the captured image or the sequence of image frames of the video content 110, the disclosed method and the imaging device 102 for P-phase data compression also ensures removal of noise from the captured image, so as to generate a refined captured image with an improved picture quality. In contrast to traditional image compression methods, where an image or a sequence of image frames may be compressed after generation of an actual image or a sequence of image frames, the generation of the compressed P-phase data values that correspond to the received plurality of blocks of P-phase data values, occurs at the time of generation of an image or a sequence of image frames by use of the image sensor 104. Thus, an additional compression ability is provided to the imaging device 102 to save memory space both at the time of generation of the image or the sequence of image frames, and post generation of the image or the sequence of image frames.

Various embodiments of the disclosure encompass numerous advantages that includes a device, such as the imaging device 102, and method for P-phase data compression. In imaging devices, such as the imaging device 102, which use a global shutter, the CDS process requires the P-phase data to be stored before the D-phase data received from an image sensor, such as the image sensor 104. The determination of an accurate predictor value for the P-phase data values by the predictor determination unit 208 provides a base to generate reconstructed blocks of P-phase data values. Further, continuous update of the determined predictor value for a next block of P-phase data values is performed based on the P-phase data values of the reconstructed previous block. As a result of the update operation of the predictor value based on the P-phase data values of the reconstructed previous block, the predictor value for all subsequent block of P-phase data values of the received plurality of blocks of P-phase data values does not require signaling at the time of generation of the compressed bit stream for decoding purposes. This further saves storage space in the memory unit 204 of the imaging device 102. Further, these and other features of the disclosed device, such as the imaging device 102, and method for P-phase data compression provide a particular concrete solution to the problem of compression of noise-like data, such as the P-phase data values, in the field of image sensor and/or camera technology.

Various embodiments of the disclosure may provide a non-transitory computer readable medium and/or storage medium, wherein there is stored thereon, a machine code and/or a set of instructions with at least one code section executable by a machine and/or a computer for P-phase data compression. The at least one code section in the imaging device 102 may cause the machine and/or computer to perform the steps that comprise reception of a plurality of blocks of P-phase data values from an image sensor. The imaging device 102 may be further configured to determine a predictor value for a first input block of P-phase data values. The imaging device 102 may be further configured to generate a reconstructed first block of P-phase data values based on the P-phase data values of the first input block and the determined predictor value. The imaging device 102 may be further configured to update the determined predictor value for a second block of P-phase data values, based on the P-phase data values of the generated reconstructed first block. Further, the imaging device 102 may be configured to generate compressed P-phase data values that correspond to the received plurality of blocks of P-phase data values, based on the reconstructed first block and at least a reconstructed second block. The reconstructed second block may be generated based on the second block of P-phase data values and the updated predictor value.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that falls within the scope of the appended claims.

What is claimed is:

1. An imaging device, comprising:
   one or more circuits configured to:
      receive a first plurality of blocks of P-phase data values and D-phase data values from an image sensor;
      determine a predictor value for a first input block of said received first plurality of blocks of P-phase data values;
      generate a reconstructed first block of P-phase data values based on a set of P-phase data values of said first input block and said determined predictor value;
      update said determined predictor value for a second block of said received first plurality of blocks of P-phase data values, based on said generated reconstructed first block of P-phase data values; and
      generate compressed P-phase data values that correspond to said received first plurality of blocks of P-phase data values based on said reconstructed first block and at least one reconstructed second block, wherein said compressed P-phase data values are generated prior to processing of said D-phase data values, and wherein said at least one reconstructed second block is generated based on said second block of said received first plurality of blocks of P-phase data values and said updated predictor value.

2. The imaging device according to claim 1, wherein said generated reconstructed first block of P-phase data values corresponds to said compressed P-phase data values of said first input block.

3. The imaging device according to claim 1, wherein said reconstructed first block is generated based on a difference between each of said set of P-phase data values of said first input block and said determined predictor value.

4. The imaging device according to claim 1, wherein said predictor value for said first input block is determined based on one of an average value or a mean value representative of said set of P-phase data values of said first input block, wherein said first input block corresponds to one of said received first plurality of blocks representative of a plurality of pixels in a current image frame.

5. The imaging device according to claim 1, wherein said predictor value for said first input block of said set of P-phase data values is determined based on a final average value of a plurality of average values of said P-phase data values, wherein said plurality of average values are column-by-column average values of a plurality of columns that correspond to a second plurality of blocks representative of a plurality of pixels in a previous image frame.

6. The imaging device according to claim 5, wherein said predictor value for said first input block is determined based on application of a polynomial function on said final average value of said plurality of average values of said P-phase data values.

7. The imaging device according to claim 1, wherein said one or more circuits are further configured to update said determined predictor value based on an average value of said P-phase data values of said generated reconstructed first block.

8. The imaging device according to claim 1, wherein said one or more circuits are further configured to compute a difference between said generated compressed P-phase data values and said D-phase data values associated with said received first plurality of blocks representative of a plurality of pixels in a current image frame.

9. The imaging device according to claim 8, wherein said one or more circuits are further configured to transform said current image frame to a refined current image frame based on said computed difference between said generated compressed P-phase data values and said D-phase data values.

10. The imaging device according to claim 9, wherein said difference is utilized for removal of noise from said current image frame to obtain said refined current image frame.

11. The imaging device according to claim 9, wherein said image sensor comprises a plurality of light-sensing elements, wherein said difference corresponds to cancellation of said P-phase data values from corresponding D-phase data values for each of said plurality of light-sensing elements to generate correlated double sampling (CDS) corrected digital output pixel values in said refined current image frame.

12. The imaging device according to claim 9, wherein said first plurality of blocks of P-phase data values are processed prior to processing of said D-phase data values so as to enable storage of said received first plurality of blocks of P-phase data values as said generated compressed P-phase data values in a memory unit of said imaging device.

13. The imaging device according to claim 1, wherein said P-phase data values correspond to digital pixel reset values that represent reference voltages of a plurality of pixels in a current image frame, and wherein said D-phase data values correspond to light dependent digital pixel values that represent signal voltages of said plurality of pixels in said current image frame.

14. The imaging device according to claim 1, wherein said second block corresponds to one of said received first plurality of blocks representative of a plurality of pixels in a current image frame.

15. A method for data compression, comprising:
   in an imaging device:

receiving a first plurality of blocks of P-phase data values and D-phase data values from an image sensor;

determining a predictor value for a first input block of said received first plurality of blocks of P-phase data values;

generating a reconstructed first block of P-phase data values based on a set of P-phase data values of said first input block and said determined predictor value;

updating said determined predictor value for a second block of said received first plurality of blocks of P-phase data values based on said generated reconstructed first block of P-phase data values; and generating compressed P-phase data values that correspond to said received first plurality of blocks of P-phase data values based on said reconstructed first block and at least one reconstructed second block, wherein said compressed P-phase data values are generated prior to processing of said D-phase data values, and wherein said at least one reconstructed second block is generated based on said second block of said received first plurality of blocks of P-phase data values and said updated predictor value.

16. The method according to claim 15, wherein said generated reconstructed first block of P-phase data values corresponds to said compressed P-phase data values of said first input block.

17. The method according to claim 15, wherein said reconstructed first block is generated based on a difference between each of said set of P-phase data values of said first input block and said determined predictor value.

18. The method according to claim 15, wherein said predictor value for said first input block is determined based on one of an average value or a mean value representative of said set of P-phase data values of said first input block, wherein said first input block corresponds to one of said received first plurality of blocks representative of a plurality of pixels in a current image frame.

19. The method according to claim 15, wherein said predictor value for said first input block of said set of P-phase data values is determined based on a final average value of a plurality of average values of said P-phase data values, wherein said plurality of average values are column-by-column average values of a plurality of columns that correspond to a second plurality of blocks representative of a plurality of pixels in a previous image frame.

20. The method according to claim 19, wherein said predictor value for said first input block of said set of P-phase data values is determined based on application of a polynomial function on said final average value of said plurality of average values of said P-phase data values.

21. The method according to claim 15, wherein said determined predictor value is updated based on an average value of said P-phase data values of said generated reconstructed first block.

22. The method according to claim 15, further comprising computing a difference between said generated compressed P-phase data values and said D-phase data values associated with said received first plurality of blocks representative of a plurality of pixels in a current image frame.

23. The method according to claim 22, further comprising transforming said current image frame to a refined current image frame based on said computed difference between said generated compressed P-phase data values and said D-phase data values.

24. The method according to claim 23, wherein said difference is utilized for removal of noise from said current image frame to obtain said refined current image frame.

25. The method according to claim 23, wherein said image sensor comprises a plurality of light-sensing elements, wherein said difference corresponds to cancellation of said P-phase data values from corresponding D-phase data values for each of said plurality of light-sensing elements to generate correlated double sampling (CDS) corrected digital output pixel values in said refined current image frame.

26. The method according to claim 23, wherein said P-phase data values are processed prior to processing of said D-phase data values so as to enable storage of said received first plurality of blocks of P-phase data values as said generated compressed P-phase data values in a memory unit of said imaging device.

27. The method according to claim 15, wherein said P-phase data values correspond to digital pixel reset values that represent reference voltages of a plurality of pixels in a current image frame, and wherein said D-phase data values correspond to light dependent digital pixel values that represent signal voltages of said plurality of pixels in said current image frame.

28. The method according to claim 15, wherein said second block corresponds to one of said received first plurality of blocks representative of a plurality of pixels in a current image frame.

* * * * *